(12) United States Patent
Aebker et al.

(10) Patent No.: US 7,794,004 B2
(45) Date of Patent: Sep. 14, 2010

(54) MULTI-COMPARTMENT CARGO SYSTEM

(75) Inventors: Paul Aebker, Dublin, OH (US);
Matthew S. Stechschulte, Hilliard, OH (US); Donald W. Jackson, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/240,476

(22) Filed: Sep. 29, 2008

(65) Prior Publication Data
US 2010/0078956 A1 Apr. 1, 2010

(51) Int. Cl.
B60R 7/02 (2006.01)
(52) U.S. Cl. .................................................. 296/37.8
(58) Field of Classification Search ................ 296/24.3, 296/24.4, 37.1, 37.8, 37.13, 37.14, 37.16
See application file for complete search history.

(56) References Cited

U.S. PATENT DOCUMENTS

| | | |
|---|---|---|
| 1,107,057 A | 8/1914 | Gilmore |
| 3,659,894 A | 5/1972 | Dodgen et al. |
| 3,764,048 A | 10/1973 | Gore |
| 4,139,231 A | 2/1979 | Lang et al. |
| 4,168,094 A | 9/1979 | Yagi |
| 4,222,601 A | 9/1980 | White et al. |
| 4,277,097 A | 7/1981 | Lalanne |
| 4,337,976 A | 7/1982 | Lapine et al. |
| 4,423,900 A | 1/1984 | Sugimoto et al. |
| 4,533,169 A | 8/1985 | Rauthmann et al. |
| 4,548,540 A | 10/1985 | Renfro |
| 4,600,233 A | 7/1986 | Boydston |
| 4,671,557 A | 6/1987 | Lemp |
| 4,695,087 A | 9/1987 | Hollrock |
| 4,733,898 A | 3/1988 | Williams |
| 4,750,774 A | 6/1988 | Pickering |
| 4,878,706 A | 11/1989 | Novikov |
| 4,941,703 A | 7/1990 | Curry |
| 4,944,544 A | 7/1990 | Dick |
| 4,946,215 A | 8/1990 | Taylor |
| 4,998,769 A | 3/1991 | Johnson et al. |
| 5,026,107 A | 6/1991 | Hess |
| 5,050,923 A | 9/1991 | Petelka |
| 5,125,710 A | 6/1992 | Gianelo |
| 5,172,519 A | 12/1992 | Cooper |
| 5,192,108 A | 3/1993 | Richardson et al. |
| 5,207,260 A | 5/1993 | Commesso |
| 5,213,387 A | 5/1993 | Decker et al. |
| 5,251,947 A | 10/1993 | Kirila, II et al. |
| 5,316,358 A | 5/1994 | Payne et al. |
| 5,324,089 A | 6/1994 | Schlachter |
| 5,372,289 A | 12/1994 | Dachicourt |
| 5,382,069 A | 1/1995 | Chambers |

(Continued)

*Primary Examiner*—H Gutman
(74) *Attorney, Agent, or Firm*—Mark E. Duell; Rankin, Hill & Clark LLP

(57) ABSTRACT

A vehicle multi-compartment cargo system includes a first storage compartment defined by a cargo bin lining. The first storage compartment has an open upper side selectively closed by a first compartment lid. A second storage compartment is also defined by the cargo bin lining. The second storage compartment has an open upper side selectively closed by a second compartment lid. The first and second compartment lids form a cargo floor. A side compartment is defined by a side lining. The side compartment has an open side extending upward from the cargo floor and is selectively closed by a side compartment lid.

17 Claims, 5 Drawing Sheets

U.S. PATENT DOCUMENTS

| | | |
|---|---|---|
| 5,458,353 A | 10/1995 | Hanemaayer |
| 5,492,257 A | 2/1996 | Demick |
| 5,518,158 A | 5/1996 | Matlack |
| 5,520,316 A | 5/1996 | Chen |
| 5,547,187 A | 8/1996 | Spykerman |
| 5,564,776 A | 10/1996 | Schlachter |
| 5,599,054 A | 2/1997 | Butz et al. |
| 5,615,922 A | 4/1997 | Blanchard |
| 5,632,520 A | 5/1997 | Butz |
| 5,636,890 A | 6/1997 | Cooper |
| 5,716,091 A | 2/1998 | Wieczorek |
| 5,762,245 A | 6/1998 | Hurst |
| 5,784,769 A | 7/1998 | Clare |
| 5,797,642 A | 8/1998 | Takanishi et al. |
| 5,799,845 A | 9/1998 | Matsushita |
| 5,823,585 A | 10/1998 | Tanguay |
| 5,823,598 A | 10/1998 | Clare et al. |
| 5,826,931 A | 10/1998 | Perlman et al. |
| 5,836,637 A | 11/1998 | Laginess et al. |
| 5,855,310 A | 1/1999 | Van Ert et al. |
| 5,860,687 A | 1/1999 | Corporon et al. |
| 5,895,086 A | 4/1999 | Carico |
| 5,915,777 A | 6/1999 | Gignac et al. |
| 5,947,358 A | 9/1999 | Wieczorek |
| 5,951,085 A | 9/1999 | Fukatsu |
| 5,961,172 A | 10/1999 | Ament et al. |
| 5,964,491 A | 10/1999 | Marsh et al. |
| 5,979,962 A | 11/1999 | Valentin et al. |
| 6,003,921 A | 12/1999 | Tozuka |
| 6,003,926 A | 12/1999 | Labeur |
| 6,015,071 A | 1/2000 | Adomeit et al. |
| 6,015,177 A | 1/2000 | Tijerina |
| 6,027,155 A | 2/2000 | Wisniewski et al. |
| 6,030,018 A | 2/2000 | Clare et al. |
| 6,033,002 A | 3/2000 | Clare et al. |
| 6,039,105 A | 3/2000 | Patmore et al. |
| 6,039,378 A | 3/2000 | Bailey |
| 6,050,202 A | 4/2000 | Thompson |
| 6,059,341 A | 5/2000 | Jensen et al. |
| 6,065,794 A | 5/2000 | Schlachter |
| 6,073,985 A | 6/2000 | Keip |
| 6,082,804 A | 7/2000 | Schlachter |
| 6,102,474 A | 8/2000 | Daley |
| 6,113,172 A | 9/2000 | Chaloult et al. |
| 6,126,219 A | 10/2000 | Wilkinson et al. |
| 6,129,401 A | 10/2000 | Neag et al. |
| 6,155,625 A | 12/2000 | Felix |
| 6,170,724 B1 | 1/2001 | Carter et al. |
| 6,199,930 B1 | 3/2001 | Riley |
| 6,224,138 B1 | 5/2001 | Adsit et al. |
| 6,231,100 B1 | 5/2001 | Fournier |
| 6,237,211 B1 | 5/2001 | Clare et al. |
| 6,241,137 B1 | 6/2001 | Corr |
| 6,247,741 B1 | 6/2001 | Seel et al. |
| 6,254,162 B1 | 7/2001 | Faber et al. |
| 6,267,427 B1 | 7/2001 | Ziehl |
| 6,283,526 B1 | 9/2001 | Keough et al. |
| 6,296,289 B1 | 10/2001 | Gehring et al. |
| 6,302,465 B1 | 10/2001 | Faber et al. |
| 6,336,671 B1 | 1/2002 | Leonardi |
| 6,439,633 B2 | 8/2002 | Nemoto |
| 6,481,773 B1 | 11/2002 | Salani et al. |
| 6,502,886 B1 | 1/2003 | Bleau et al. |
| 6,644,709 B2 | 11/2003 | Inagaki et al. |
| 6,644,710 B2 | 11/2003 | Seel et al. |
| 6,719,348 B2 | 4/2004 | Song |
| 6,732,895 B2 | 5/2004 | Poliquin et al. |
| 6,749,241 B1 | 6/2004 | Erlandsson et al. |
| 6,752,304 B1 | 6/2004 | Hotary et al. |
| 6,811,198 B2 * | 11/2004 | Caro et al. ............... 296/37.8 |
| 6,832,799 B2 | 12/2004 | Haspel et al. |
| 6,874,667 B2 | 4/2005 | Dykstra et al. |
| 6,883,851 B2 | 4/2005 | McClure et al. |
| 6,945,594 B1 * | 9/2005 | Bejin et al. ............ 296/193.07 |
| 7,011,352 B2 | 3/2006 | Matsuoka et al. |
| 7,017,980 B1 * | 3/2006 | Bejin et al. ............ 296/193.07 |
| 7,059,646 B1 | 6/2006 | DeLong et al. |
| 7,066,532 B2 * | 6/2006 | Schoemann ........... 296/193.07 |
| 7,090,274 B1 | 8/2006 | Khan et al. |
| 7,118,017 B1 * | 10/2006 | Geraghty et al. ............ 224/542 |
| 7,195,304 B1 | 3/2007 | Schmeichel |
| 2001/0013709 A1 | 8/2001 | Clare et al. |
| 2001/0052714 A1 | 12/2001 | Clare |
| 2003/0000982 A1 * | 1/2003 | Gehring et al. ............ 224/539 |
| 2004/0105744 A1 * | 6/2004 | Warner et al. ............. 414/522 |

\* cited by examiner

MULTI-COMPARTMENT CARGO SYSTEM

BACKGROUND

The present disclosure generally relates to cargo systems for vehicles, and particularly relates to a multi-compartment cargo system for a vehicle, such as a sport utility vehicle, crossover vehicle, station wagon or the like.

A large variety of storage systems have been employed in vehicles. In recent years, the proliferation of sport utility vehicles, crossover vehicles, station wagons and the like has created a new set of challenges for vehicle designers. In particular, the challenge centers around the area disposed behind the rear-most seating area in a vehicle. This area is typically open to view from an exterior of the vehicle.

Compartments are also well known in vehicles. For example, vehicle compartments include the glove box, roof and/or seat consoles, compartments in doors, seat backs or sides of a cargo area. Such compartments are sometimes covered or closed by a hinged door or lid. Compartments are also known which extend below the floor of a cargo area. For example, spare-wheel storage areas are often disposed beneath the floor in the cargo area of a vehicle.

SUMMARY

According to one aspect, a multi-compartment cargo system is provided for a vehicle. More particularly, in accordance with this aspect, the multi-compartment cargo system includes a cargo bin lining having an upper side forming a cargo floor of the vehicle. A first storage compartment is defined by the cargo bin lining. The first storage compartment is recessed from the upper side with a first compartment opening defined in the upper side. The first storage compartment longitudinally extends laterally across the vehicle. A second storage compartment is defined by the cargo bin lining. The second storage compartment is recessed from the upper side with a second compartment opening defined in the upper side and positioned rearwardly relative to the first compartment opening. The second storage compartment longitudinally extends laterally across the vehicle. A first lid is disposed over the first compartment opening and further forms the cargo floor. The first lid is selectively openable for providing access to the first storage compartment. A second lid is disposed over the second compartment opening and further forms the cargo floor. The second lid is selectively openable for providing access to the second storage compartment. A side lining has a front side forming a lateral wall of the vehicle. The lateral interior wall extends upward from the cargo floor. A side compartment is defined by the side lining. The side compartment is recessed from the front side with a side compartment opening defined in the front side. A side compartment lid is disposed over the side compartment opening and further forms the lateral interior wall. The side lid is selectively openable for providing access to the side storage compartment.

According to another aspect, a vehicle multi-compartment cargo system is provided. More particularly, in accordance with this aspect, the vehicle multi-compartment cargo system includes a first storage compartment defined by a cargo bin lining. The first storage compartment has an open upper side selectively closed by a first compartment lid. A second storage compartment is defined by the cargo bin lining. The second storage compartment has an open upper side selectively closed by a second compartment lid. The first and second compartment lids form a cargo floor. A side compartment is defined by a side lining. The side compartment has an open side extending upward from the cargo floor and selectively closed by a side compartment lid.

According to still another aspect, a multi-compartment cargo system is provided. More particularly, in accordance with this aspect, the multi-compartment cargo system includes a laterally extending first storage compartment having an open upper side. A first storage compartment lid is pivotally mounted over the open upper side for providing selective access to the first storage compartment. A laterally extending second storage compartment has an open side. The first and second storage compartments are arranged in side-by-side relation. A second storage compartment lid is pivotally mounted over the open side of the second storage compartment for providing selective access to the second storage compartment. A side compartment extends along adjacent ends of the first and second storage compartments. The side compartment has an open side disposed at the adjacent ends. A side lid is pivotally mounted over the open side of the side compartment for providing selective access to the side storage compartment.

DETAILED DESCRIPTION

Figure 1:
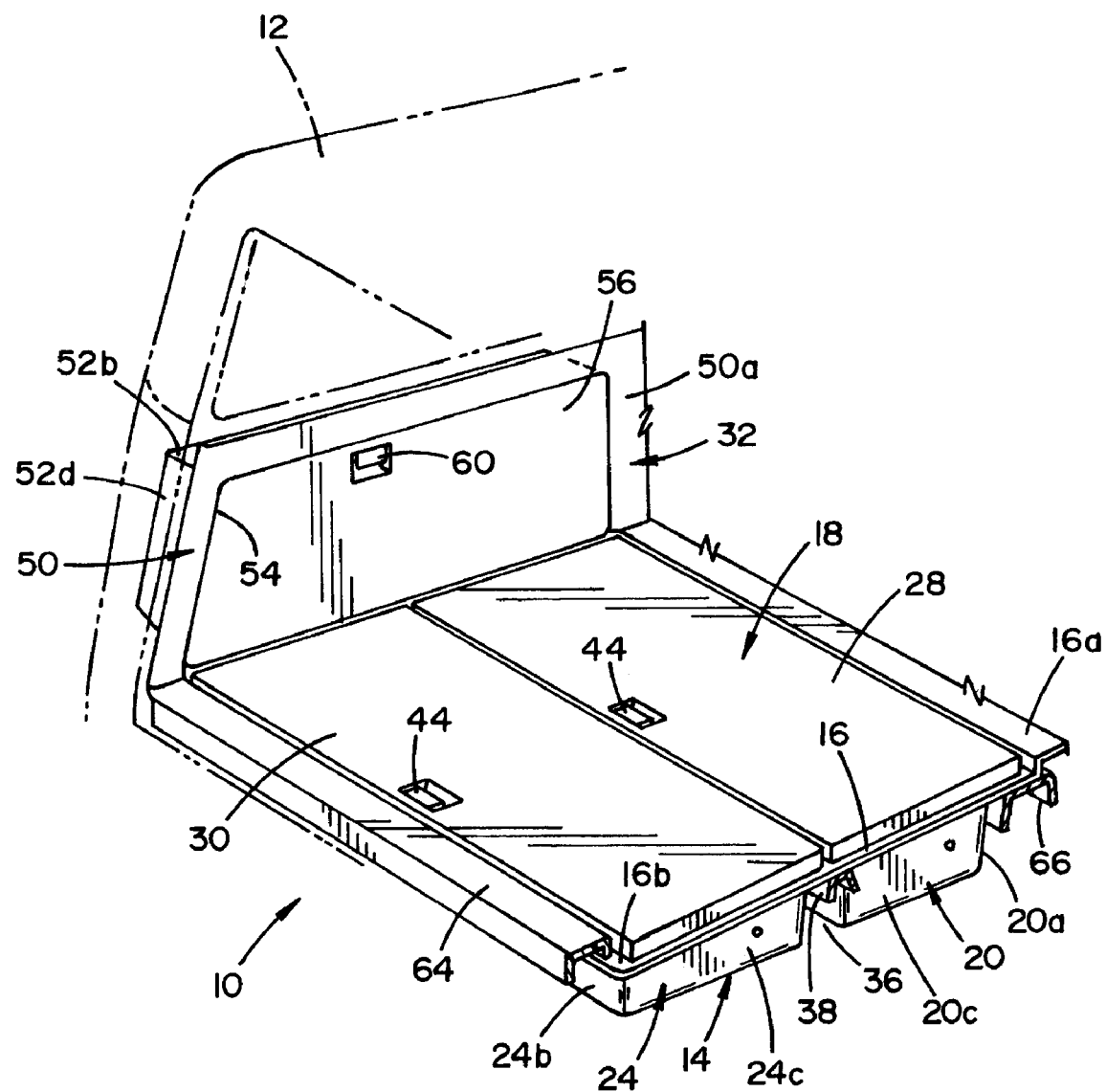
FIG. 1 is a perspective view of a multi-compartment cargo system for a vehicle having first and second storage compartments arranged in side-by-side relation and longitudinally extending laterally across the vehicle.
Figure 5:
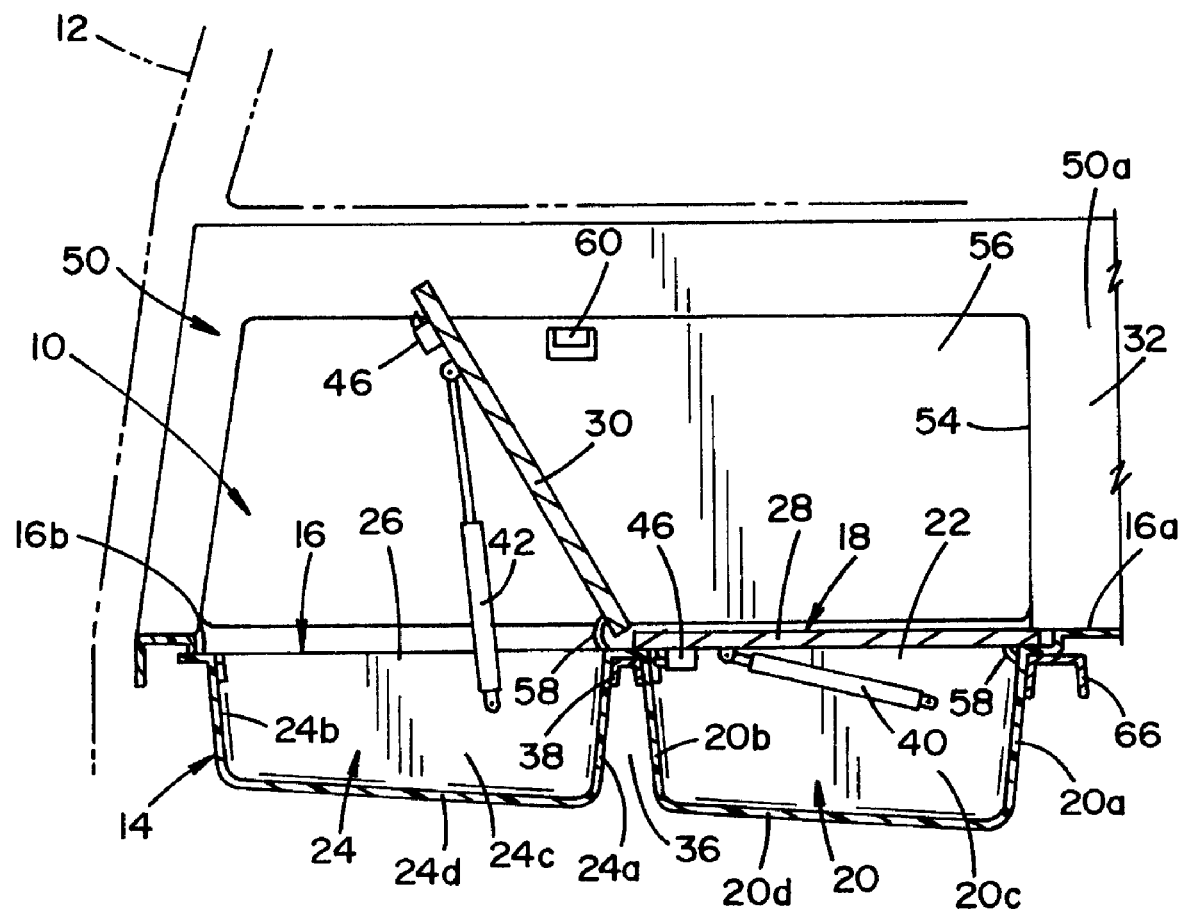
FIG. 5 is a cross sectional view of the multi-compartment cargo system taken along the line 5-5 of FIG. 3.

Referring now to the drawings, wherein the showings are for purposes of illustrating one or more exemplary embodiments, FIG. 1 shows a multi-compartment cargo system 10 of a vehicle 12. The cargo system 10 can be positioned within a passenger compartment of the vehicle 12 rearwardly behind the rear-most seats of the vehicle (not shown), for example. With additional reference to FIG. 5, the cargo system 10 includes a cargo bin lining 14 having an upper side 16 that can at least partially form a cargo floor 18 of the vehicle 12. In the illustrated embodiment, the upper side 16 includes a forwardly disposed portion 16a and a recessed portion 16b that enables the provision of the cargo floor 18 being relatively flat or planar. Of course, however, other configurations of the cargo bin lining 14 and/or the upper side 16 thereof are contemplated and could easily be substituted for those shown in the illustrated embodiment.

As shown, a first storage compartment 20 is defined by the cargo bin lining 14. Particularly, the first storage compartment 20 can be recessed from the upper side 16 with a first compartment opening 22 defined in the upper side 16. The first storage compartment 20 longitudinally extends laterally across the vehicle 12. A second storage compartment 24 is also defined by the cargo bin lining 14. The second storage compartment 24 can be recessed from the upper side 16 with a second compartment opening 26 defined in the upper side 16 and positioned rearwardly relative to the first compartment opening 22. Like the first storage compartment 20, the second storage compartment 24 longitudinally extends laterally across the vehicle 12.

Figure 3:
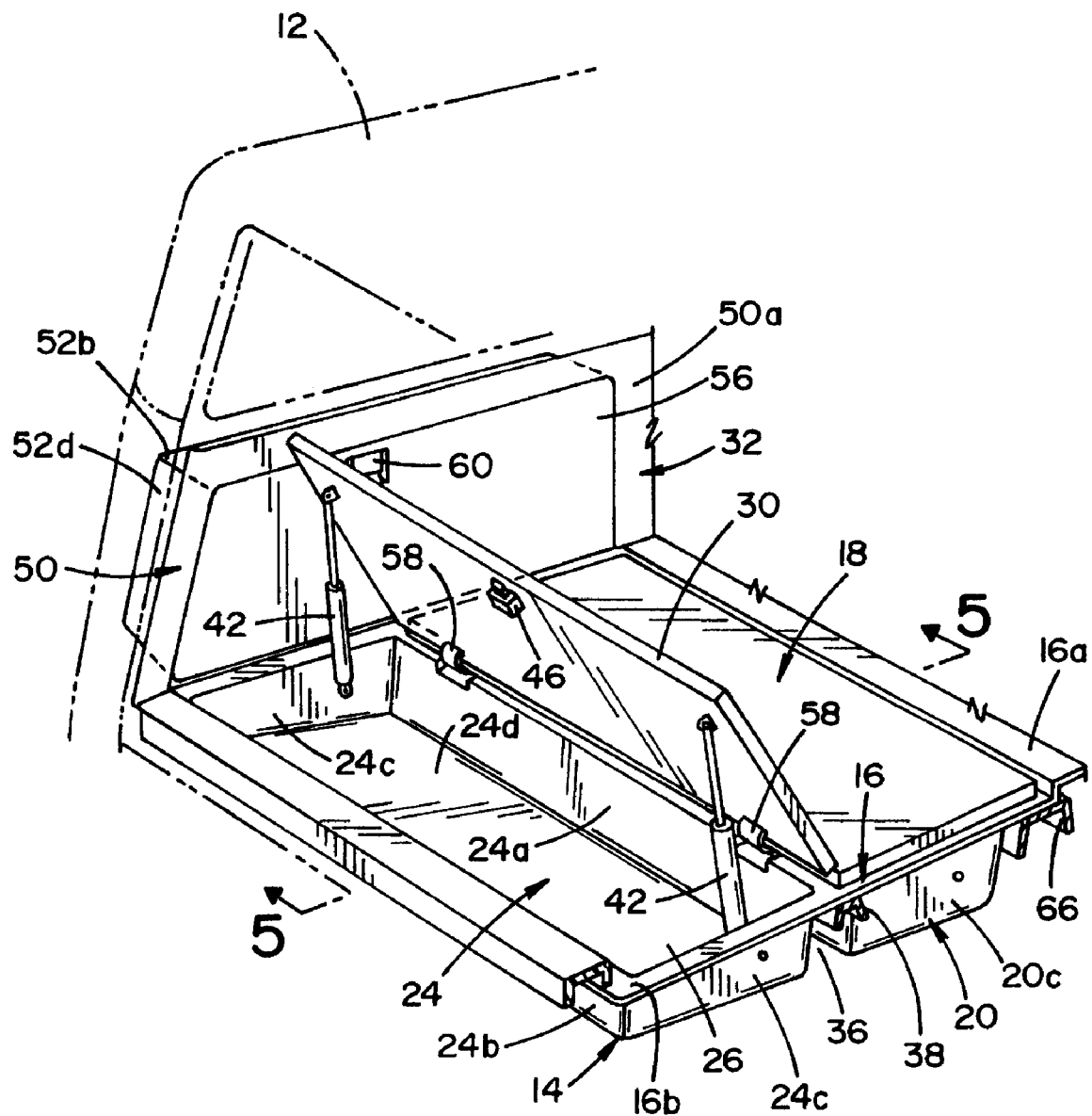
FIG. 3 is another perspective view of the multi-compartment cargo system shown with a second lid opened to provide access to the second storage compartment.
Figure 4:
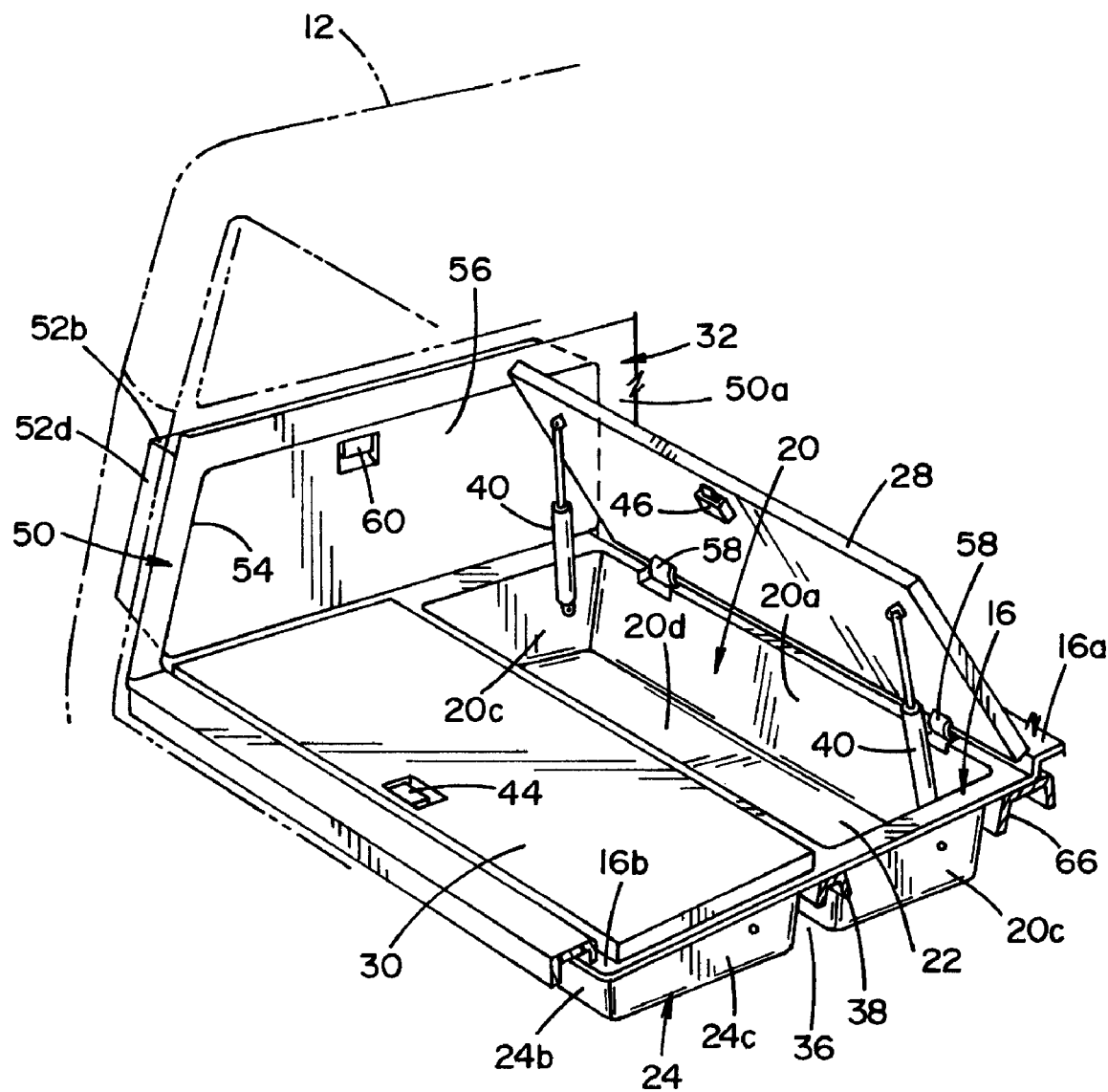
FIG. 4 is another perspective view of the multi-compartment cargo system shown with a first lid opened to provide access to the first storage compartment.

A first lid 28 is disposed over the first compartment opening 22 thereby selectively closing the open upper side of the first storage compartment 20. Likewise, a second lid 30 is disposed over the second compartment opening 26 to selectively close the open upper side of the second storage compartment 24. In combination with the upper side 16 of the cargo bin lining 14, the first and second compartment lids 28,30 form the cargo floor 18. As best shown in FIG. 4, the first lid 28 is selectively openable for providing access to the first storage compartment 20. Likewise, as best shown in FIG. 3, the second lid 30 is selectively openable for providing access to the second storage compartment 24.

The first storage compartment 20 has or is defined by a forward wall 20a, a rearward wall 20b spaced apart from the forward wall 20a, and spaced apart side walls 20c extending between the forward and rearward walls 20a,20b. Likewise, a second storage compartment 24 has or is defined by a forward wall 24a, a rearward wall 24b spaced apart from the forward wall 24a, and spaced apart side walls 24c extending between the forward and rearward walls 24a,24b. Both compartments 20,24 also include respective bottom walls 20d,24d.

As shown, the first and second storage compartments 20,24 are each rectangular shaped having a major dimension extending laterally across the vehicle 12 from a lateral interior wall 32 on one side of the vehicle 12 to an opposite, lateral interior wall (not shown) and a minor dimension extending lengthwise (i.e., in a direction of travel) along the vehicle 12. As shown, the first and second storage compartments 20,24 are separated from one another by a dividing wall. In the illustrated embodiment, the dividing wall is formed of the rearward wall 20b of the first storage compartment 20 and the forward wall 24a of the second storage compartment 24. Particularly, in the illustrated embodiment, the rearward wall 20b and the forward wall 24a are spaced apart from one another to define an underside recess 36 within which a cross member 38 of a vehicle frame can be received providing support and rigidity to the lining 14, and ultimately to the cargo floor 18. In the illustrated embodiment, the rearward wall 20b of the first storage compartment 20 and the forward wall 24a of the second storage compartment 24 divide and separate the first and second storage compartments 20,24 from one another.

For purposes of maximizing the available storage space provided by the cargo system 10, the first and second storage compartments 20,24 are oriented in front-to-back relation relative to one another and extend laterally across the entire width of the vehicle interior. As shown, the lids 28,30 can be pivotally connected to the cargo bin lining 14 by hinges 58 along respective forward walls 20a,24a of the first and second storage compartments 20,24. The lids 28,30 can each include dampers 40,42 for facilitating easier opening of the lids. Optionally, the lids 28,30 can be removably pivotally connected to the cargo bin lining 14 and thus could be removable from the cargo bin lining 14. As already indicated, the first lid 28 can be pivotally mounted over the open upper side of the first storage compartment 20 for providing selective access thereinto. Likewise, the second lid 30 can be pivotally mounted over the open side of the second storage compartment 24 for providing selective access thereinto. As best shown in FIG. 1, the lids 28,30 form the cargo floor 18 of the vehicle 12 when closed. As shown, the lids 28,30 can each include a handle 44 and latch 46 for facilitating opening and closing of the lids.

Figure 2:
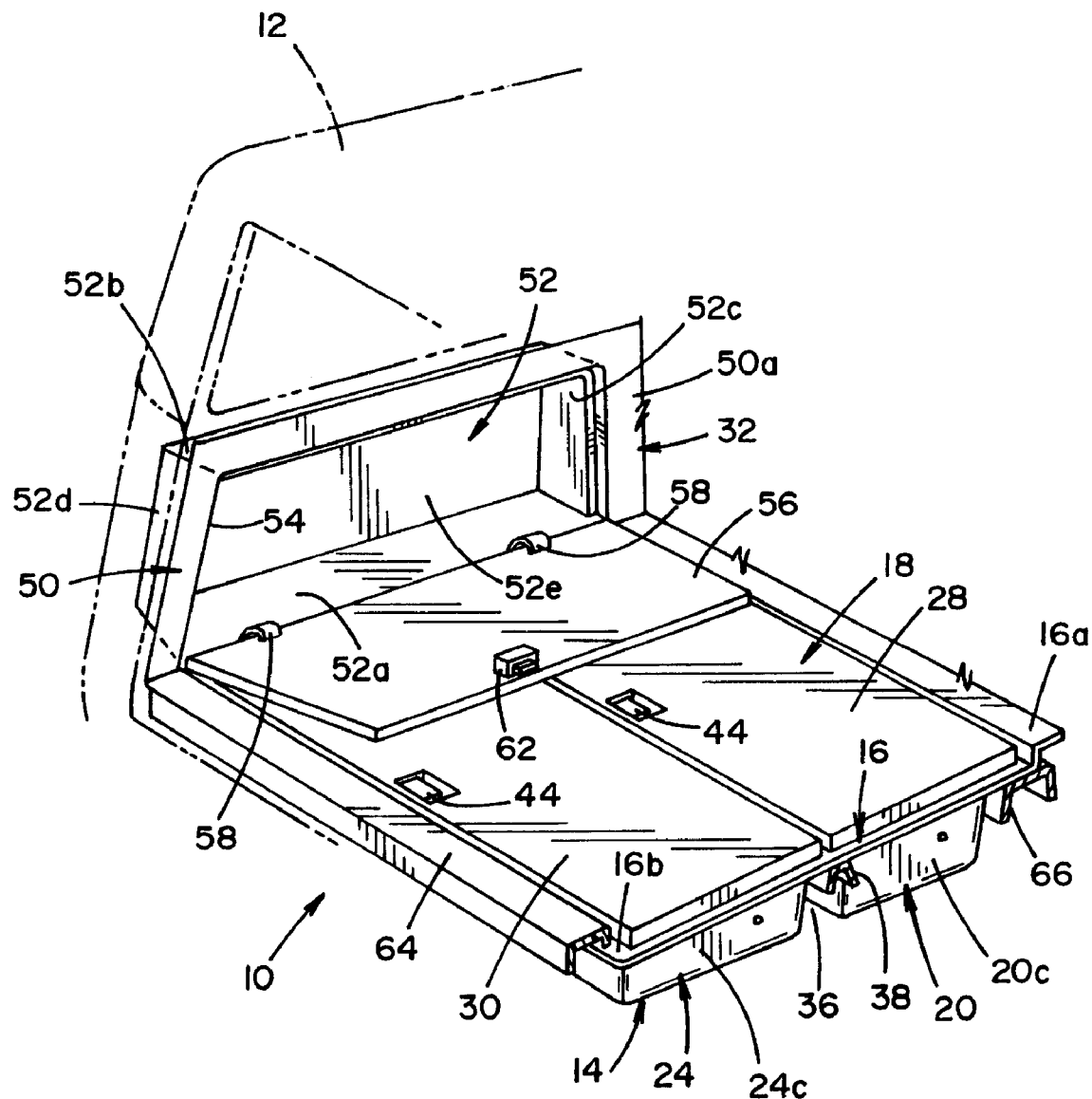
FIG. 2 is another perspective view of the multi-compartment cargo system shown with a side compartment lid opened to provide access to a side storage compartment.

The cargo system 10 can additionally include a side lining 50 having a front side 50a partially forming the lateral interior wall 32 of the vehicle 12. As shown, the lateral interior wall 32, and the front side 50a of the side lining 50, extend upward from the cargo floor 18. A side compartment 52 is defined by the side lining 50. As best shown in FIG. 2, the side compartment 52 is recessed from the front side 50a with a side compartment opening 54 defined in the front side 50a. In particular, the side compartment 52 has an open side, i.e., side compartment opening 54, extending upward from the cargo floor 18. Also, as best shown in FIG. 2, the side compartment 52 is formed by the lower wall 52a, an upper wall 52b spaced apart from the lower wall and spaced apart side walls 52c,52d extending between the lower and upper walls 52a,52b. The side compartment also includes a rear wall 52e. In the illustrated embodiment, the cargo bin lining 14 and the side lining 50 are formed separately and are discrete members within the cargo system 10. However, it is to be appreciated by those of skill in the art that the cargo bin lining 14 and the side lining 50 could be integrally formed (i.e., of one piece) or could be formed of any number of components.

The side compartment 52 of the illustrated embodiment has a major dimension extending lengthwise along the vehicle 12 (i.e., in a direction of travel) and laterally adjacent the first and second storage compartments 20,24. In particular, in the illustrated embodiment, the major dimension of the side compartment 52 extends from about the front wall 20a of the first storage compartment 20 to about the rear wall 24b of the second storage compartment 24. In this arrangement, the side storage compartment 52 is disposed laterally along an entire length of both the first and second storage compartments 20,24 in a direction of travel of the vehicle. This further maximizes storage capacity within the cargo system 10. In particular, the side compartment 52 extends along adjacent ends of the first and second storage compartments 20,24. The open side 54 of the side compartment 52 is disposed at the adjacent ends of the storage compartments 20,24.

A side compartment lid 56 is disposed (i.e., pivotally mounted) over the side compartment opening 54 to selectively close the side compartment 52. In particular, the side compartment lid 56 is pivotally connected to the side lining 50 along the lower wall 52a of the side compartment 52a. When closed, the side compartment lid 56 further forms the lateral interior wall 32. The side lid 56 is selectively openable, as shown in FIG. 2, for providing access to the side storage compartment 52. In the illustrated embodiment, the side lid 56 is pivotally connected via hinges 58 to the side lining 50 adjacent the cargo floor 18. Like the lids 28,30, the side compartment lid 56 can include a handle 60 and latch 62 for facilitating opening and closing of the side lid. Also, though not included in the illustrated embodiment, the side compartment lid 56 could be provided with a damper similar to dampers 40,42.

The lesser elevation of the recessed portion 16b of the cargo bin lining 14 allows the lids 28,30 to rest flushly with the raised forward portion 16a thereby forming the cargo floor 18 flatly or generally planarly. In the illustrated embodiment, the lateral interior wall 32 is oriented approximately normal or perpendicular relative to the cargo floor 18 of the vehicle 12. Accordingly, the open side 54 of the side compartment 52 is defined in a plane oriented approximately normal or perpendicular relative to the cargo floor 18. A garnish or trim member 64 can be disposed rearwardly of the rear compartment 24 to further form the cargo floor 18 and improve the aesthetics of the cargo system 10. Alternatively, the garnish member 64 could be integrally formed with one or both of the linings 14,50.

In addition to resting on the cross member 38, a forward portion of the lining 14 can rest on a second cross member 66. Likewise, though not shown, a rearward portion of the liner 14 could also rest on a cross member of the vehicle 12.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-compartment cargo system for a vehicle, comprising:
   a cargo bin lining having an upper side forming a cargo floor of the vehicle;
   a first storage compartment defined by said cargo bin lining, said first storage compartment recessed from said upper side with a first compartment opening defined in said upper side, said first storage compartment longitudinally extending laterally across said vehicle;
   a second storage compartment defined by said cargo bin lining, said second storage compartment recessed from said upper side with a second compartment opening defined in said upper side and positioned rearwardly relative to said first compartment opening, said second storage compartment longitudinally extending laterally across said vehicle;
   a first lid disposed over said first compartment opening and further forming said cargo floor, said first lid selectively openable for providing access to said first storage compartment;
   a second lid disposed over said second compartment opening and further forming said cargo floor, said second lid selectively openable for providing access to said second storage compartment;
   a side lining having a front side forming a lateral interior wall of the vehicle, said lateral interior wall extending upward from said cargo floor;
   a side compartment defined by said side lining, said side compartment recessed from said front side with a side compartment opening defined in said front side; and
   a side compartment lid disposed over said side compartment opening and further forming said lateral interior wall, said side lid selectively openable for providing access to said side storage compartment,
   wherein each of said first and second storage compartments is defined by a rearward wall, a forward wall spaced apart from said rearward wall and spaced apart sidewalls extending between said forward and rearward walls, said rearward wall of said first storage compartment and said forward wall of said second storage compartment spaced apart from one another to divide and separate said first and second storage compartments from one another; and
   wherein said rearward wall of said first storage compartment and said forward wall Of said second storage compartment define an underside recess that receives a cross member of a vehicle frame.

2. The multi-compartment cargo system of claim 1 wherein said first and second storage compartments are each rectangular shaped having a major dimension extending laterally across said vehicle from said lateral interior wall to an opposite, lateral interior wall and a minor dimension extending lengthwise along the vehicle.

3. The multi-compartment cargo system of claim 1 wherein said lateral interior wall is oriented approximately normal relative to said cargo floor of the vehicle.

4. The multi-compartment cargo system of claim 1 wherein said side compartment has a major dimension extending lengthwise along the vehicle and laterally adjacent said first and second storage compartments.

5. The multi-compartment cargo system of claim 4 wherein said major dimension of said side compartment extends from about a front wall of said first storage compartment to about a rear wall of said second storage compartment.

6. The multi-compartment cargo system of claim 1 wherein said first And second lids are pivotally connected to said cargo bin lining along respective forward walls of said first and second storage compartments.

7. The multi-compartment cargo system of claim 6 wherein said side lid is pivotally connected to said side lining adjacent said cargo floor.

8. The multi-compartment cargo system of claim 6 wherein said first and said second lids include dampers for facilitating easier opening of said first and said second lids.

9. The multi-compartment cargo system of claim 6 wherein said first and said second lids are removably pivotally connected to said cargo bin lining and thereby are removable from said cargo bin lining.

10. A vehicle multi-compartment cargo system, comprising:
    a first storage compartment defined by a cargo bin lining, said first storage compartment having an open upper side selectively closed by a first compartment lid;
    a second storage compartment defined by a cargo bin lining, said second storage compartment having an open upper side selectively closed by a second compartment lid, said first and second compartment lids forming a cargo floor; and
    a side compartment defined by said side lining, said side compartment having an open side extending upward from said cargo floor and selectively closed by a side compartment lid, wherein said first and second storage compartments are separated from one another by a dividing wall that is formed of a rearward wall of said first storage compartment and a forward wall of said second storage compartment, said rearward wall and said forward wall spaced apart from one another to define an underside recess within which a cross member of a vehicle frame is received.

11. The vehicle multi-compartment cargo system of claim 10 wherein said open side of said side compartment is defined in a plane oriented approximately normal relative to said cargo floor.

12. The vehicle multi-compartment cargo system of claim 11 wherein said side compartment lid is pivotally connected to said side lining along a lower wall of said side compartment.

13. The vehicle multi-compartment cargo system of claim 10 wherein said first and second storage compartments extend between lateral interior sides of a vehicle and said side compartment lid at least partially forms one of said lateral interior sides of the vehicle.

14. The vehicle multi-compartment cargo system of claim 13 wherein said first and second storage compartments are oriented in front-to-back relation relative to one another.

15. The vehicle multi-compartment cargo system of claim 14 wherein said side storage compartment is disposed laterally along an entire length of both of said first and second storage compartments in a direction of travel of the vehicle.

16. A multi-compartment cargo system, comprising:

a laterally extending first storage compartment having an open upper side;

a first storage compartment lid pivotally mounted over said open upper side for providing selective access to said first storage compartment;

a laterally extending second storage compartment having an open side, said first and second storage compartments arranged in side-by-side relation;

a second storage compartment lid pivotally mounted over said open side of said second storage compartment for providing selective access to said second storage compartment;

a side compartment extending along adjacent ends of said first and second storage compartments, said side compartment having an open side disposed at said adjacent ends; and a side lid pivotally mounted over said open side of said side compartment for providing selective access to said side storage compartment wherein said first storage compartment has a rearward wall adjacent said second storage compartment and said second storage compartment has a forward wall adjacent said first storage compartment, said rearward wall and said forward wall spaced apart from one another to define an underside recess for accommodating a cross member of a vehicle frame.

17. The multi-compartment cargo system of claim 16 wherein said first and second storage lids form a cargo floor of a vehicle when closed.

* * * * *